US011836257B2

(12) United States Patent
Rathore et al.

(10) Patent No.: US 11,836,257 B2
(45) Date of Patent: Dec. 5, 2023

(54) METHOD AND SYSTEM FOR DEFENDING UNIVERSAL ADVERSARIAL ATTACKS ON TIME-SERIES DATA

(71) Applicant: Tata Consultancy Services Limited, Mumbai (IN)

(72) Inventors: Pradeep Rathore, Pune (IN); Arghya Basak, Pune (IN); Sri Harsha Nistala, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 379 days.

(21) Appl. No.: 17/377,296

(22) Filed: Jul. 15, 2021

(65) Prior Publication Data

US 2022/0058273 A1   Feb. 24, 2022

(30) Foreign Application Priority Data

Jul. 17, 2020  (IN) .............................. 202021030571

(51) Int. Cl.
  *G06F 21/57* (2013.01)
  *G06N 3/08* (2023.01)
  *G06N 3/045* (2023.01)
(52) U.S. Cl.
  CPC ............ *G06F 21/577* (2013.01); *G06N 3/08* (2013.01); *G06F 2221/034* (2013.01); *G06N 3/045* (2023.01)
(58) Field of Classification Search
  CPC .............................. G06F 21/577; G06N 3/08
  See application file for complete search history.

(56) References Cited

U.S. PATENT DOCUMENTS

| 10,152,970 | B1* | 12/2018 | Olabiyi | G06N 20/00 |
| 11,049,500 | B2* | 6/2021 | Olabiyi | G10L 13/027 |
| 11,275,819 | B2* | 3/2022 | Kursun | G06F 21/32 |
| 11,481,637 | B2* | 10/2022 | Malaya | G06N 3/045 |
| 11,562,244 | B2* | 1/2023 | Wang | G06F 21/577 |

(Continued)

FOREIGN PATENT DOCUMENTS

WO    WO2019053052 A1    3/2019

OTHER PUBLICATIONS

Fawaz, Hassan Ismail et al., "Adversarial Attacks on Deep Neural Networks for Time Series Classification", Machine Learning, Apr. 2019, Arxiv, https://arxiv.org/pdf/1903.07054.pdf.

*Primary Examiner* — Viral S Lakhia
(74) *Attorney, Agent, or Firm* — Finnegan, Henderson, Farabow, Garrett & Dunner LLP

(57) ABSTRACT

Data is prone to various attacks such as cyber-security attacks, in any industry. State of the art systems in the domain of data security fail to identify adversarial attacks in real-time, and this leads to security issues, as well as results in the process/system providing unintended results. The disclosure herein generally relates to data security analysis, and, more particularly, to a method and system for assessing impact of adversarial attacks on time series data and providing defenses against such attacks. The system performs adversarial attacks on a selected data-driven model to determine impact of the adversarial attacks on the selected data model, and if the impact is such that performance of the selected data model is less than a threshold, then the selected data model is retrained.

15 Claims, 5 Drawing Sheets

(56) References Cited

U.S. PATENT DOCUMENTS

| | | | |
|---|---|---|---|
| 11,651,205 B2* | 5/2023 | Terjek | G06F 18/2132 |
| | | | 706/25 |
| 2019/0147300 A1 | 5/2019 | Bathen et al. | |
| 2019/0370683 A1* | 12/2019 | Metzen | G06N 20/00 |
| 2020/0342306 A1* | 10/2020 | Giovannini | G06N 3/08 |
| 2021/0073376 A1* | 3/2021 | Tran | G06N 3/045 |
| 2022/0174089 A1* | 6/2022 | Piegert | G06V 10/82 |

\* cited by examiner

METHOD AND SYSTEM FOR DEFENDING UNIVERSAL ADVERSARIAL ATTACKS ON TIME-SERIES DATA

PRIORITY CLAIM

This U.S. patent application claims priority under 35 U.S.C. § 119 to: India Application No. 202021030571, filed on Jul. 17, 2020. The entire contents of the aforementioned application are incorporated herein by reference.

TECHNICAL FIELD

The disclosure herein generally relates to cyber-physical security systems, and, more particularly, to a method and system for assessing impact of universal adversarial attacks on time series data and for defending such attacks.

BACKGROUND

With the world moving towards automation, extensive research is being carried out with the intention of automating various processes and systems. Machine learning is an important aspect when it comes to automation. Machine learning techniques learn patterns in data obtained from various processes and generate one or more data models which represent the process. Such data models emulate working of the actual processes and are hence used for applications such as but not limited to optimization of industrial processes. However, attacks on such data leads to data security issues. Further, as such attacks may corrupt the data, use of the corrupted data for other applications such as the optimization process may not provide intended results. For example, in a healthcare industry, ECG signal is an important parameter that is measured to assess the health of a patient, for diagnosing various diseases/abnormalities, etc. Appropriate treatment for the patient is determined based on analysis of such signals. However, if the ECG data is corrupted by an attacker using adversarial attack, then the assessment and treatment identified may be not appropriate and may prove fatal for the patient.

SUMMARY

Embodiments of the present disclosure present technological improvements as solutions to one or more of the above-mentioned technical problems recognized by the inventors in conventional systems. For example, in one embodiment, a processor implemented method for defending universal adversarial attack is provided. Data from a plurality of data sources are received as input, via one or more hardware processors. The received data is then pre-processed via the one or more hardware processors. Further, drift in the preprocessed data in comparison with a training data in at least one data-driven model from a plurality of first set of data-driven models is determined, via the one or more hardware processors. Further, a regime that matches the preprocessed data is identified, via the one or more hardware processors. Further, a data-driven model that matches the identified regime is selected from a plurality of first set of data-driven models, via the one or more hardware processors. Further, one or more universal adversarial attacks are performed on the selected data-driven model, via the one or more hardware processors. Performing the one or more universal adversarial attacks involves computing a universal adversarial perturbation, in a plurality of iterations. Computing the universal adversarial perturbation further involves computing an update to each of a plurality of first data samples from the data, by taking an optimum step in the direction of the gradient of loss with respect to the corresponding data sample. Further the computed update is added to a previous value of universal adversarial perturbation. Then the universal adversarial perturbation is clipped after adding the computed update. Once the universal adversarial perturbation is computed, in the next step, performance of the selected data-driven model after performing the one or more universal adversarial attacks is estimated via the one or more hardware processors. If the estimated performance of the selected data-driven model after performing the one or more universal adversarial attacks is less than a threshold of performance, then the selected data-driven model is retrained via the one or more hardware processors. The retraining of the selected data-driven model further involves generating a plurality of second data samples using a plurality of data augmentation techniques including generative models from a second set of data-driven models and a plurality of adversarial attack techniques, wherein the plurality of second data samples has similar distribution as that of the first data samples, and in a further step, the selected data-driven model is updated using a combination of the plurality of the first data samples and the plurality of the second data samples.

In another aspect, a system for defending universal adversarial attack is provided. The system includes one or more hardware processors, a communication interface, and a memory comprising a plurality of instructions. The plurality of instructions when executed, cause the one or more hardware processors to receive data from a plurality of data sources as input. The received data is then pre-processed via the one or more hardware processors. Further, drift in the preprocessed data in comparison with a training data in at least one data-driven model from a plurality of first set of data-driven models is determined, via the one or more hardware processors. Further, a regime that matches the preprocessed data is identified, via the one or more hardware processors. Further, a data-driven model that matches the identified regime is selected from a plurality of first set of data-driven models, via the one or more hardware processors. Further, one or more universal adversarial attacks are performed on the selected data-driven model, via the one or more hardware processors. Performing the one or more universal adversarial attacks involves computing a universal adversarial perturbation, in a plurality of iterations. Computing the universal adversarial perturbation further involves computing an update to each of a plurality of first data samples from the data, by taking an optimum step in the direction of the gradient of loss with respect to the corresponding data sample. Further the computed update is added to a previous value of universal adversarial perturbation. Then, the universal adversarial perturbation is clipped after adding the computed update. Once the universal adversarial perturbation is computed, in the next step, performance of the selected data-driven model after performing the one or more universal adversarial attacks is estimated via the one or more hardware processors. If the estimated performance of the selected data-driven model after performing the one or more universal adversarial attacks is less than a threshold of performance, then the selected data-driven model is retrained via the one or more hardware processors. The retraining of the selected data-driven model further involves generating a plurality of second data samples using a plurality of data augmentation techniques including generative models from a second set of data-driven models and a plurality of adversarial attack techniques, wherein the plurality of second data samples has similar distribution as that of the first data samples, and in a further step, the selected data-driven model is updated using a combination of the plurality of the first data samples and the plurality of the second data samples.

In yet another aspect, a non-transitory computer readable medium for defending universal adversarial attack is provided. The non-transitory computer readable medium includes a plurality of instructions, which when executed, cause one or more hardware processors to defend universal adversarial attack using the approach elaborated herein. Data from a plurality of data sources are received as input, via one or more hardware processors. The received data is then pre-processed via the one or more hardware processors. Further drift in the preprocessed data in comparison with a training data in at least one data-driven model from a plurality of first set of data-driven models is determined, via the one or more hardware processors. Further, a regime that matches the preprocessed data is identified, via the one or more hardware processors. Further, a data-driven model that matches the identified regime is selected from a plurality of first set of data-driven models, via the one or more hardware processors. Further, one or more universal adversarial attacks are performed on the selected data-driven model, via the one or more hardware processors. Performing the one or more universal adversarial attacks involves computing a universal adversarial perturbation, in a plurality of iterations. Computing the universal adversarial perturbation further involves computing an update to each of a plurality of first data samples from the data, by taking an optimum step in the direction of the gradient of loss with respect to the corresponding data sample. Further the computed update is added to a previous value of universal adversarial perturbation. Then the universal adversarial perturbation is clipped after adding the computed update. Once the universal adversarial perturbation is computed, in the next step, performance of the selected data-driven model after performing the one or more universal adversarial attacks is estimated via the one or more hardware processors. If the estimated performance of the selected data-driven model after performing the one or more universal adversarial attacks is less than a threshold of performance, then the selected data-driven model is retrained via the one or more hardware processors. The retraining of the selected data-driven model further involves generating a plurality of second data samples using a plurality of data augmentation techniques including generative models from a second set of data driven models and a plurality of adversarial attack techniques, wherein the plurality of second data samples has similar distribution as that of the first data samples, and in a further step, the selected data-driven model is updated using a combination of the plurality of the first data samples and the plurality of the second data samples.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
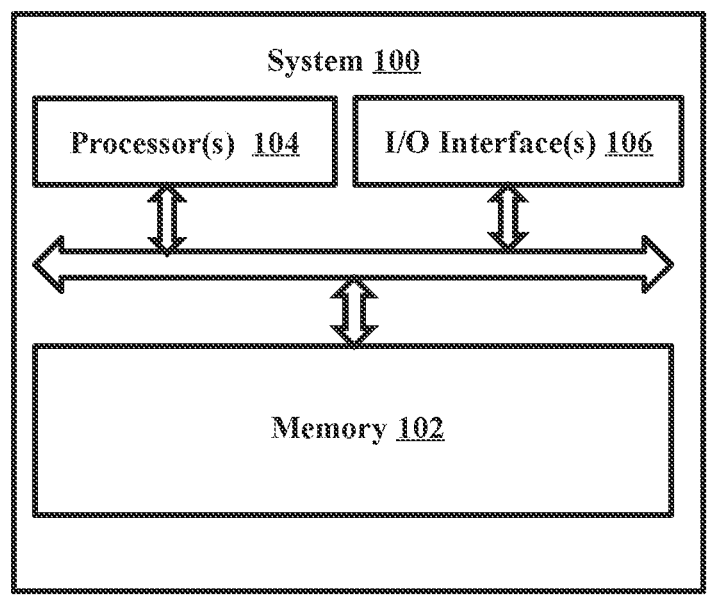
FIG. 1 illustrates an exemplary system for defending universal adversarial attack, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Glossary

Mathematical definitions of a time series data classification problem addressed by the method and system herein are given below:

$X^i \in R^T$ is the $i^{th}$ sample of the dataset X and T is the sequence length of the sample $Y^i \in [0, K-1]$ where $Y^i$ is the true class for $i^{th}$ sample K is the number of unique classes of X $X_{adv}^i$ is the adversarial sample corresponding to $X^i$ $Y_T^i$ is the target class corresponding to $X^i$ which an attacker wants the model to predict $\varepsilon_{max} \in R$ is the upper bound of $L_\infty$ norm of the allowed perturbation for X $\varepsilon_{max}^i \in R^T$ is the upper bound of $L_\infty$ norm of the allowed perturbation for $X^i$ $f(.): R^T \to R^K$ is any data-driven model $\hat{Y}^i$ is the class predicted by f(.) corresponding to $X^i$ $L(f, X^i, Y^i)$ and $L_T(f, X^i, Y_T^i)$ are the losses corresponding to the sample $X^i$, data-driven model f(.) for untargeted and targeted attacks respectively N is the number of steps in BIM (Basic Iterative Method)

$\alpha \in R$ is the small step size for BIM $R_{fooling} \in R$ is the desired fooling ratio i.e. fraction of samples fooled from a given dataset $Epoch_{fool}$ is the maximum number of epochs to run to achieve $R_{fooling}$ $U \in R^T$ is the universal adversarial perturbation for the dataset X $X_{FGSM, \varepsilon_{max}}^i \in R^T$ is the adversarial sample corresponding to $X^i$ using FGSM (Fast Gradient Sign Method)

Error(.): computes misclassification error ratio of a dataset.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary system (100) for defending universal adversarial attack, according to some embodiments of the present disclosure. FIG. 1 illustrates an exemplary system for design and execution of experiments, according to some embodiments of the present disclosure. In an embodiment, the system 100 includes a processor (s) 104, communication interface device(s), alternatively referred as input/output (I/O) interface(s) 106, and one or more data storage devices or a memory 102 operatively coupled to the processor (s) 104. In an embodiment, the processor (s) 104, can be one or more hardware processors (104). In an embodiment, the one or more hardware processors (104) can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a Graphical User Interface (GUI), and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices to one another or to another server. For example, the I/O interface 106 enables the authorized user to access the system disclosed herein through the GUI and communicate with one or more other similar systems 100.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Thus, the memory 102 may comprise information pertaining to input(s)/output(s) of each step performed by the processor(s) 104 of the system 100 and methods of the present disclosure. Various steps involved in the process of defending the universal adversarial attacks by the system 100 are depicted in FIG. 2A through FIG. 3 and are explained below with reference to the components of the system 100.

Figure 2A:
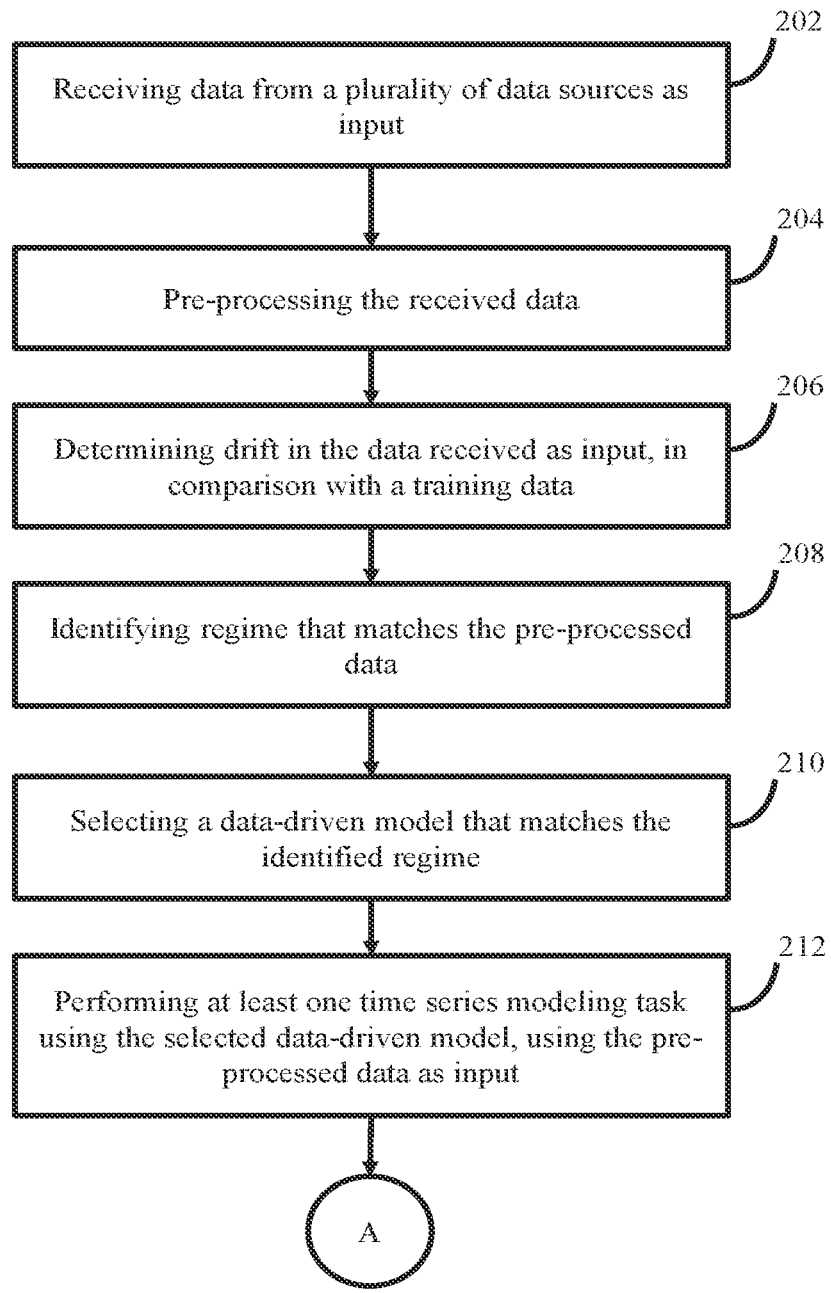
FIGS. 2A and 2B (collectively referred to as FIG. 2) is a flow diagram depicting steps involved in the process of defending the universal adversarial attack, by the system of FIG. 1, according to some embodiments of the present disclosure.
Figure 2B:
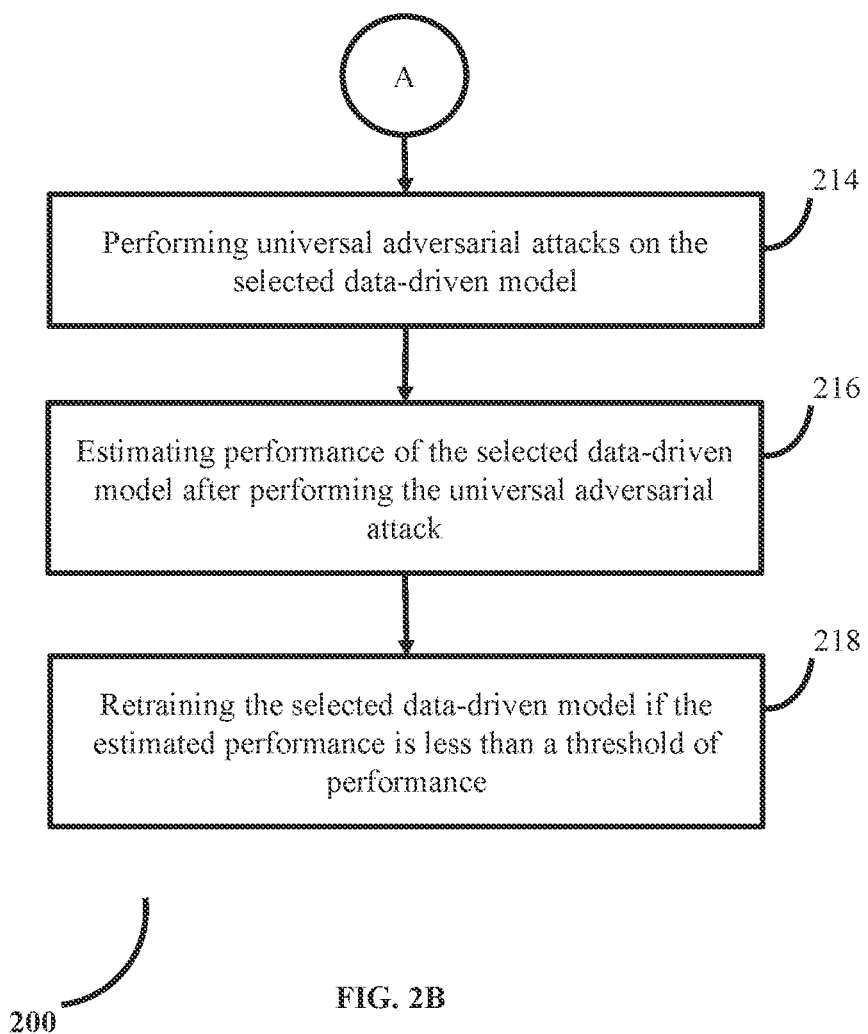
Figure 3:
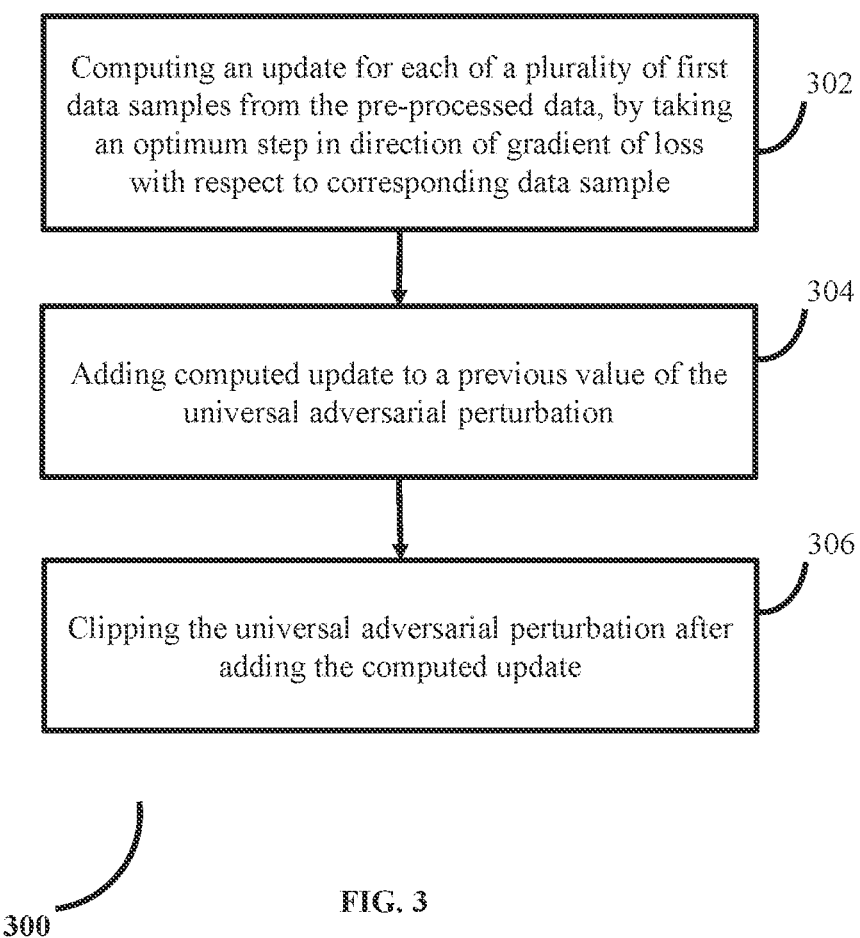
FIG. 3 is a flow diagram depicting steps involved in the process of computing a universal adversarial perturbation update at each data point, by the system of FIG. 1, in accordance with some embodiments of the present disclosure.

FIGS. 2A and 2B (collectively referred to as FIG. 2) is a flow diagram depicting steps involved in the process of defending the universal adversarial attack, by the system of FIG. 1, according to some embodiments of the present disclosure.

Figure 4:
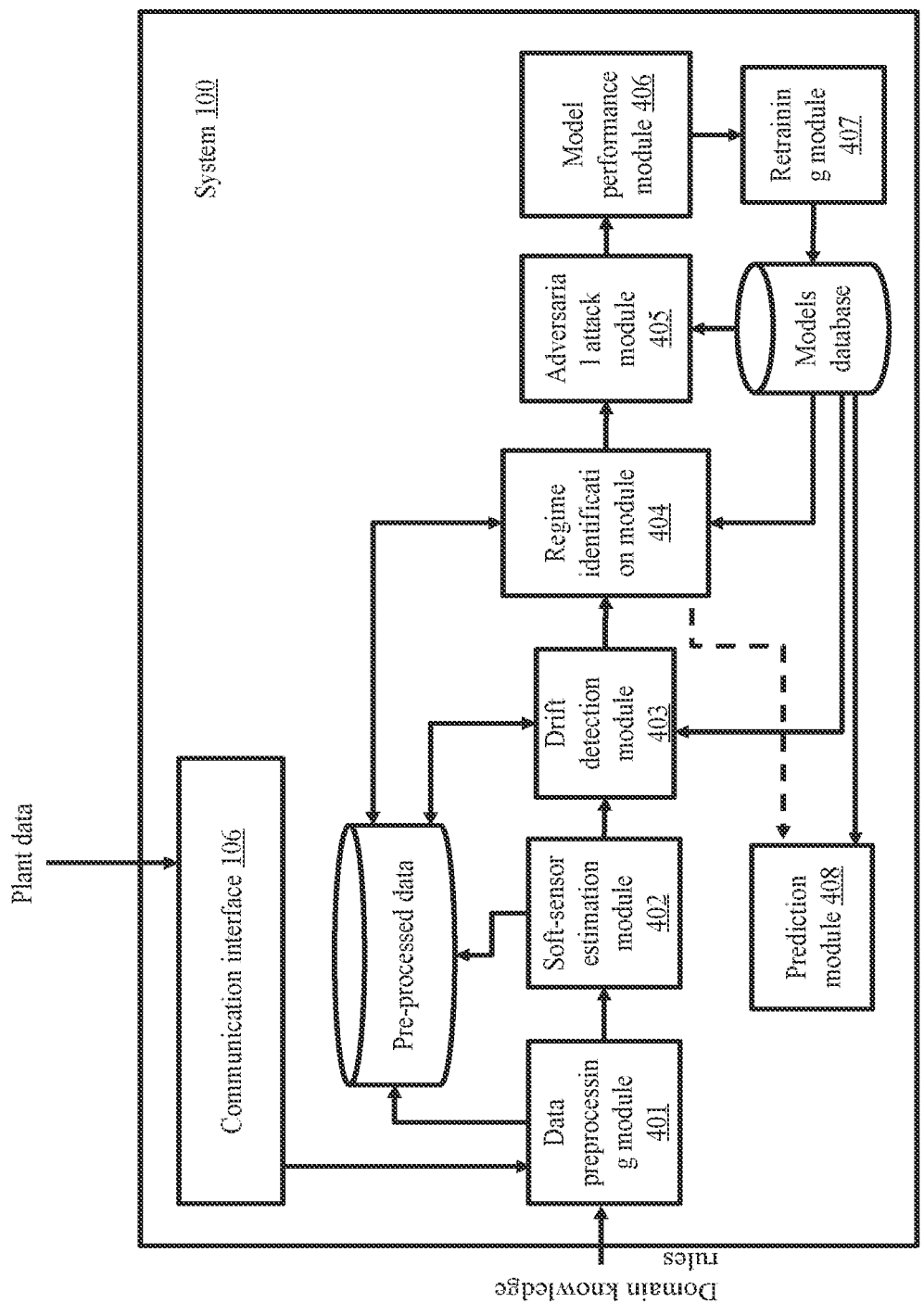
FIG. 4 is an example implementation of the system of FIG. 1 in an industrial plant environment to defend universal adversarial attack, in accordance with some embodiments of the present disclosure.

The system 100 performs targeted, untargeted and universal adversarial attacks on time series data collected as input. The system 100 is also configured to perform retraining of one or more data-driven models in response to targeted, untargeted and universal adversarial attacks. For the purpose of explaining the process, working of the system 100 in an industrial plant environment is considered, and in such environment, the system 100 may be implemented as depicted in FIG. 4. However, it is to be noted that the system 100 can be configured to perform the attack and mitigation of the targeted, untargeted and universal adversarial attacks on data from any other application/environment, by following the approach depicted in FIG. 2 and FIG. 3, and in such scenarios, the system 100 may be implemented accordingly as per requirements. Various data processing modules depicted in FIG. 4 may be implementation of the one or more hardware processors 104.

In this process, at step 202, the system 100 receives data from one or more data sources as input, via the communication interface 106. In various embodiments, the data may be real-time data as well as non-real-time data. For example, if the system 100 is used for performing the identification of targeted, untargeted and universal adversarial attacks for data from an industrial plant, values of various process parameters (for example, temperature, pressure, flow rates, levels, quantity of specific materials and so on) are collected as the real-time input, whereas information on parameters that are not available in real-time such as those measured or tested at laboratories (for example, chemical compositions of substances/materials used), are collected as the non-real-time inputs/data.

The system 100 then preprocesses the received input data at step 204, using the data preprocessing module 401. Pre-processing the data involves identification and removal of outliers using one or more univariate and multivariate methods such as but not limited to 'out of range detection', followed by imputation, and synchronization and integration of a plurality of variables from one or more data sources, by the system 100. During the pre-processing stage, the system 100 may also interact with one or more soft-sensors in the soft-sensor estimation module 402, so as to estimate parameters that cannot be measured using physical sensors due to practical limitations. The soft-sensors contain physics-based models and data-driven models that can derive required features, and value of the derived features, as required. The pre-processed data as well as the soft-sensor data (i.e. the data derived using the soft-sensors) are then stored in an appropriate database in the memory 102, for further processing. For the purpose of explaining, the pre-processed data and the soft-sensor data stored in the database are together referred to as 'pre-processed data'.

Further the system 100 determines at step 206, any drift in the preprocessed data in comparison with a training data in at least one data-driven model from a plurality of first set of data-driven models, using the drift detection module 403. The term 'training data' in this context refers to a reference data of the plant operation and performance, in terms of values of different process parameters, and is an expected/intended performance of the plant. The term 'drift' in this context refers to a deviation of the preprocessed data from the training data, and indicates that the performance and operating parameters of the plant do not match one or more expected levels. A drift detection module of the system 100 determines the drift by analyzing the preprocessed data using one or more appropriate multivariate outlier and drift detection methods such as but not limited to deep learning based encoder-decoder, isolation forest, principal component analysis and one class support vector machine. The system 100 may process the preprocessed data directly, or after transforming the preprocessed data, and if the drift is detected, then the system 100 may archive the data. In an embodiment, the system 100 may perform labelling of the data being archived. The system 100 may also provide an interface for an authorized user to access the system 100 and provide one or more inputs to assist in the labeling of data. The data being processed by the system 100 may belong to one or more regimes. In an embodiment, at least one data-driven model set is generated for each regime and is stored in a database in the memory 102. Each data-driven model set further includes a first set of data-driven models and a second set of data-driven models. Each data-driven model in the first set of data-driven models is trained to perform at least one time series modeling task such as regression and classification. The first set of data-driven models may be built using statistical, machine learning and deep learning techniques such as but not limited to variants of regression (multiple linear regression, stepwise regression, forward regression, backward regression, partial least squares regression, principal component regression, Gaussian process regression, polynomial regression, etc.), decision tree and its variants (random forest, bagging, boosting, bootstrapping), support vector regression, k-nearest neighbors regression, spline fitting or its variants (e.g. multi adaptive regression splines), artificial neural networks and it variants (multi-layer perceptron, recurrent neural networks & its variants e.g. long short term memory networks, and convolutional neural networks) and time series regression models. Further, the first set of data-driven models also include statistical, machine learning or deep learning based one-class or multi-class classification, scoring or diagnosis models such as principal component analysis, Mahalanobis distance, isolation forest, random forest classifiers, one-class support vector machine, artificial neural networks and its variants, elliptic envelope and auto-encoders (e.g. dense auto-encoders, LSTM auto-encoders). Each data-driven model in the second set of data-driven models is a generative adversarial network based generative model which learns the distribution of data for the regime and generates data samples whose distribution matches that of the training data of the corresponding regime.

The system 100 has a database in the memory 102, which is used to store information on different regimes, wherein data belonging to each domain are specified. Further at step 208, the system 100 identifies regime of a current data point or a batch of data points, by processing the pre-processed data using one or more regime identification models in a model database in the memory 102, using the regime identification module 404. By processing the preprocessed data, the system 100 identifies regime that matches the current data point or a batch of data points. While identifying the regime that matches the pre-processed data, the system determines whether the (the pre-processed) input data belongs to an intended regime or a global outlier using a plurality of data-driven regime identification models. The data-driven regime identification models comprise models built using statistical, machine learning and deep learning techniques such as random forest classifiers, support vector machine classifiers, artificial neural networks and its variants, and auto-encoders (e.g. dense auto-encoders, LSTM auto-encoders). In an embodiment, if no matching regime is identified (i.e. data matching the preprocessed data is not found in any of the regimes), then the system 100 may provide suitable interface for the authorized user to define new regime(s).

Once the regime is identified (or new regime is defined), the system 100, at step 210, selects a data-driven model (may be alternately referred to as 'model') from a plurality of first set of data-driven models stored in a database in the memory 102, as a data-driven model which matches the identified regime. In an embodiment, the system 100 selects the data-driven model matching with each regime, based on a mapping between the data models and regimes. Each regime may be provided a unique 'regime ID', and each regime ID is then mapped with one or more data-driven models (for example, 'Regime ID→data driven model 'X''). Information on such mapping may be stored in a reference database by the system 100. While processing real-time data, after identifying regime the input data belongs to, the system 100 identifies the data-driven model matching the identified regime, based on data in this reference table.

At step 212, the system 100 performs at least one time series modeling task using the selected data-driven model. The time series modeling task may be at least one of regression, classification, anomaly detection, anomaly localization and prognosis. By performing the at least one time series modeling task using the selected data-driven model, the system 100 extracts/predicts values of various parameters associated with the process/system being monitored, using the prediction module 408. Examples of such data extracted/predicted parameters are, but not limited to, health index of an industrial process/machine, estimated value of a key performance indicator (KPI) and so on. The step of performing the time series modeling task for prediction/extraction of parameters can be executed in parallel to the step 214 by the system 100.

Further, at step 214, the system 100 performs one or more universal adversarial attacks on the selected data-driven model, using the adversarial attack module 405. In various embodiments, the system 100 performs targeted as well as untargeted adversarial attacks on the selected data-driven model. For example, the system 100 performs an FGSM (fast gradient sign method) attack and a BIM (basic iterative method) attack on the selected data-driven model. Details of the FGSM and BIM attacks are given below:

1. FGSM Attack:

The FGSM attack is a single step attack which generates adversarial sample by adding a perturbation $X^i$ in the direction of the sign of 'gradient of loss' w.r.t. input. Alternatively, the adversarial sample for an untargeted attack is obtained by:

$$X_{adv}^i = X^i + \varepsilon^i \cdot \mathrm{sign}(\nabla_X L(f, X^i, Y^i)) \quad (1)$$

Adversarial sample for targeted attack where an attacker misguides the model to predict a target class $Y_{target}^i$ corresponding to $X^i$ is obtained by:

$$L_T = -L \quad (2)$$

$$X_{adv}^i = X^i + \varepsilon^i \cdot \mathrm{sign}(\nabla_X L_T(f, X^i, Y_T^i)) \quad (3)$$

where, $L_T$ is equal to negative of L. In case of targeted attacks, the loss between the predicted class and the target class is minimized, whereas in case of untargeted attack the loss between the predicted class and the true class are maximized.

2. BIM Attack:

In the BIM attack, FGSM is iteratively applied on a sample data by taking a smaller step size and after each iteration, output is clipped to a value such that the adversarial sample lies within a certain pre-specified limit, which is within the ε-neighborhood of the original input $X^i$.

Untargeted adversarial sample $X_{adv}^i$, is calculated using equations (4) and (5).

$$X_{adv,0}^i = X^i \quad (4)$$

$$X_{adv,N}^i = \min\{X^i + \varepsilon_{max}^i, \max\{X_{adv,N-1}^i + \alpha \cdot \mathrm{sign}(\nabla_X L(X_{adv,N-1}^i, Y^i)), X^i - \varepsilon_{max}^i\}\} \quad (5)$$

Similarly, targeted adversarial sample $X_{adv,T}^i$ is calculated using equations (6) and (7).

$$X_{adv,T,0}^i = X^i \quad (6)$$

$$X_{adv,T,N}^{i} = \min\{X^{i} + \varepsilon_{max}^{i}, \max\{X_{adv,T,N-1}^{i} + \alpha \cdot \text{sign}(\nabla_X L_T(X_{adv,T,N-1}^{i}, Y_T^{i})), X^{i} - \varepsilon_{max}^{i}\}\} \quad (7)$$

The system 100 also performs a universal adversarial attack on the selected data-driven model, wherein a universal adversarial perturbation U for a given dataset X is defined such that it can misguide most samples from a data input distribution μ of X, and is expressed in (8).

$$f(X^i + U) \neq Y^i \text{ for } X^i \sim \mu \quad (8)$$

The universal adversarial perturbation is calculated such that two conditions are satisfied, (a) infinity norm of the perturbation is less than or equal to $\varepsilon_{max}$, (b) the universal adversarial perturbation achieves a desired fooling ratio. These conditions are expressed as:

$$\|U\|_\infty \leq \varepsilon_{max} \quad (9)$$

$$\underset{X^i \sim \mu}{P}(f(X^i + U) \neq Y^i) \geq R_{fooling} \quad (10)$$

The aforementioned steps involved in the process of performing the adversarial attack on the selected data-driven model are depicted in FIG. 3. At step 302 the system 100 computes an update of each of a plurality of first data samples from the preprocessed data, by taking an optimum step in direction of gradient of loss with respect to a corresponding data sample. Further, at step 304 the system 100 adds the computed update to a previous value of the universal adversarial perturbation. At a first iteration, the 'previous value' of the universal adversarial perturbation refers to an initial value of the of the universal adversarial perturbation. In the subsequent iterations, the 'previous value' of the universal adversarial perturbation refers to cumulative value of the universal adversarial perturbation at the end of the previous iteration. Further, at step 306, the output is clipped such that the adversarial sample lies within the certain pre-specified limit.

After performing such adversarial attacks on the selected data-driven model, the system 100 estimates, at step 216, performance of the selected data-driven model, so as to assess impact of the adversarial attacks on the selected data-driven model, using the model performance module 406. Some examples of parameters which are used by the system 100 to assess the performance of data-driven model include precision, recall or true positive rate, false positive rate, missed detection rate, overall accuracy, F-score, Area under ROC (receiver operating characteristic) curve, Mean Square Error (MSE), Mean Absolute Error (MAE), Root Mean Square Error (RMSE), hit rate, coefficient of determination, and so on. At this step, U is calculated by iterating over all samples in X, while neglecting at least a few samples for which a predicted class is wrong. The system 100 is also configured to neglect at least a few "hard" samples for which the FGSM attack was unsuccessful. For each of the remaining samples, ΔU having minimum norm is computed by exploring different step sizes in the direction of the gradient of loss with respect to each sample. Further, projection of U+ΔU is taken on $\varepsilon_{max}$ infinity ball to ensure that the constraint $\|U\|_\infty \leq \varepsilon_{max}$ is satisfied.

The system 100 then compares the estimated performance of the selected data-driven model with a threshold of performance. If the estimated performance of the selected data-driven model is less than the threshold of performance, then at step 218, the system 100 performs retraining of the selected data-driven model using the retraining module 407, so as to update the selected data-driven model in order to overcome vulnerability to adversarial attacks. At this stage, the system 100 generates a plurality of second data samples using a plurality of data augmentation techniques including generative models, from a second set of data-driven models and a plurality of adversarial attack techniques. The second data samples have a distribution similar to that of the first data samples. Further the system 100 updates the selected data-driven model using a combination of the plurality of the first data samples and the plurality of the second data samples. The system 100 performs an adversarial training of the selected data-driven model at this stage. In an embodiment, the system 100 performs training of all the data-driven models, for data corresponding to each regime, using a regime specific training data, regime-specific augmented data and corresponding adversarial samples. The training of data-driven models may involve modifying the learning techniques and the variables used in the models. For example, if the selected data-driven model were a random forest classification model, during retraining, techniques others than random forest such as support vector machine classification and artificial neural network classification may also be considered. For generating the adversarial samples, the system 100 uses original regime-specific training data and corresponding augmented data. For data augmentation of each regime-specific dataset, the system 100 may use a data generator trained using GAN, random masking and quantization, and so on. In the random masking, the system 100 initially assigns a zero value to randomly selected instances and then interpolates them using one or more suitable univariate and multivariate interpolation algorithms. After random masking, the system 100 initially chooses a fixed number of levels between a minimum value and a maximum value of each univariate time series data. Further, individual data point values in the time series data are rounded off to nearest levels. By performing the adversarial training on data-driven models for each regime, robust regime-specific adversarially trained data models can be obtained, which are difficult to fool.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of data security for time series data used in data-driven models. The embodiment, thus provides a mechanism for identifying regimes matching a given input data, selecting a corresponding data-driven model and performing universal adversarial attack on the input data in order to misguide the selected data-driven model. Moreover, the embodiments herein further provide a mechanism for retraining a data-driven model if estimated performance of the data-driven model due to the attack on the input data is identified as below a threshold of performance.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g.

any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for defending universal adversarial attack, comprising:
   receiving data from a plurality of data sources as input, via one or more hardware processors;
   pre-processing the received data, via the one or more hardware processors;
   determining drift in the preprocessed data in comparison with a training data in at least one data-driven model from a plurality of first set of data-driven models, via the one or more hardware processors;
   identifying a regime that matches the preprocessed data, via the one or more hardware processors;
   selecting a data-driven model that matches the identified regime, from a plurality of first set of data-driven models, via the one or more hardware processors;
   performing one or more universal adversarial attacks on the selected data-driven model, via the one or more hardware processors, comprising:
      computing a universal adversarial perturbation, in a plurality of iterations, comprising:
         computing an update to each of a plurality of first data samples from the data, by taking an optimum step in the direction of the gradient of loss with respect to a corresponding data sample in the training data;
         adding the computed update to a previous value of the universal adversarial perturbation; and
         clipping the universal adversarial perturbation after adding the computed update;
   estimating performance of the selected data-driven model after performing the one or more universal adversarial attacks, via the one or more hardware processors; and
   retraining the selected data-driven model if the estimated performance of the selected data-driven model after performing the one or more universal adversarial attacks is less than a threshold of performance, via the one or more hardware processors, wherein the retraining comprises:
      generating a plurality of second data samples using a plurality of data augmentation techniques including generative models from a second set of data driven models and a plurality of adversarial attack techniques, wherein the plurality of second data samples has similar distribution as that of the first data samples; and
      updating the selected data-driven model using a combination of the plurality of the first data samples and the plurality of the second data samples.

2. The method as claimed in claim 1, wherein the pre-processing comprises identification and removal of outliers, imputation of missing data, and synchronization and integration of a plurality of variables from one or more data sources.

3. The method as claimed in claim 1, wherein the drift in the preprocessed data is determined using a plurality of data-driven drift detection models.

4. The method as claimed in claim 1, wherein the identification of regime comprises of determining whether the data belongs to an intended regime or a global outlier using a plurality of data-driven regime identification models.

5. The method as claimed in claim 1, wherein a data-driven model set is generated for each regime, comprising:
   a first set of data-driven models, wherein the first set of data-driven models is trained to perform at least one of time series modeling task; and a second set of data-driven models, wherein each data-driven model in the second set of data-driven models is a generative adversarial network based generative model which learns distribution of data for the regime and which generates data samples which matches training data of the corresponding regime.

6. The method as claimed in claim 1, wherein the time series modeling task is one of a classification, regression, and an anomaly detection task.

7. The method as claimed in claim 1, wherein the data collected as input is at least one of a real-time data and a non-real-time data.

8. A system for defending universal adversarial attack, comprising:
one or more hardware processors;
a communication interface; and
a memory comprising a plurality of instructions, wherein the plurality of instructions when executed, cause the one or more hardware processors to:
receive data from a plurality of data sources as input;
pre-process the received data;
determine drift in the preprocessed data in comparison with a training data in at least one data-driven model from a plurality of first set of data-driven models;
identify a regime that matches the preprocessed data;
select a data-driven model that matches the identified regime, from a plurality of first set of data-driven models;
perform one or more universal adversarial attacks on the selected data-driven model, comprising:
computing a universal adversarial perturbation, in a plurality of iterations, comprising:
computing an update to each of a plurality of first data samples from the data, by taking an optimum step in the direction of the gradient of loss with respect to a corresponding data sample in the training data;
adding the computed update to a previous value of universal adversarial perturbation; and
clipping the universal adversarial perturbation after adding the computed update;
estimate performance of the selected data-driven model after performing the one or more universal adversarial attacks; and
retrain the selected data-driven model if the estimated performance of the selected data-driven model after performing the one or more universal adversarial attacks is less than a threshold of performance, wherein the retraining comprises:
generating a plurality of second data samples using a plurality of data augmentation techniques including generative models from a second set of data driven models and a plurality of adversarial attack techniques, wherein the plurality of second data samples has similar distribution as that of the first data samples; and
updating the selected data-driven model using a combination of the plurality of the first data samples and the plurality of the second data samples.

9. The system as claimed in claim 8, wherein the pre-processing comprises of identification and removal of outliers, imputation of missing data, and synchronization and integration of a plurality of variables from one or more data sources.

10. The system as claimed in claim 8, wherein the system determines the drift in the preprocessed data using a plurality of data-driven drift detection models.

11. The system as claimed in claim 8, wherein the system identifies the regime by determining whether the data belongs to an intended regime or a global outlier, using a plurality of data-driven regime identification models.

12. The system as claimed in claim 8, wherein a data-driven model set is generated for each regime, comprising:
a first set of data-driven models, wherein the first set of data-driven models is trained to perform at least one of time series modeling task; and
a second set of data-driven models, wherein each data-driven model in the second set of data-driven models is a generative adversarial network based generative model which learns distribution of data for the regime and which generates data samples which matches training data of the corresponding regime.

13. The system as claimed in claim 8, wherein the time series modeling task is one of a classification, regression, and an anomaly detection task.

14. The system as claimed in claim 8, wherein the system collects at least one of a real-time data and a non-real-time data as input.

15. A non-transitory computer readable medium for defending universal adversarial attack, wherein the non-transitory computer readable medium comprising a plurality of instructions, which when executed, cause:
receiving data from a plurality of data sources as input, via one or more hardware processors;
pre-processing the received data, via the one or more hardware processors;
determining drift in the preprocessed data in comparison with a training data in at least one data-driven model from a plurality of first set of data-driven models, via the one or more hardware processors;
identifying a regime that matches the preprocessed data, via the one or more hardware processors;
selecting a data-driven model that matches the identified regime, from a plurality of first set of data-driven models, via the one or more hardware processors;
performing one or more universal adversarial attacks on the selected data-driven model, via the one or more hardware processors, comprising:
computing a universal adversarial perturbation, in a plurality of iterations, comprising:
computing an update to each of a plurality of first data samples from the data, by taking an optimum step in the direction of the gradient of loss with respect to a corresponding data sample in the training data;
adding the computed update to a previous value of the universal adversarial perturbation; and
clipping the universal adversarial perturbation after adding the computed update;
estimating performance of the selected data-driven model after performing the one or more universal adversarial attacks, via the one or more hardware processors; and
retraining the selected data-driven model if the estimated performance of the selected data-driven model after performing the one or more universal adversarial attacks is less than a threshold of performance, via the one or more hardware processors, wherein the retraining comprises:
generating a plurality of second data samples using a plurality of data augmentation techniques including generative models from a second set of data driven models and a plurality of adversarial attack techniques, wherein the plurality of second data samples has similar distribution as that of the first data samples; and updating the selected data-driven model using a combination of the plurality of the first data samples and the plurality of the second data samples.

* * * * *